United States Patent [19]

Banakis et al.

[11] Patent Number: 5,725,394
[45] Date of Patent: Mar. 10, 1998

[54] GROUNDING SYSTEM FOR IC CARDS

[75] Inventors: Emanuel G. Banakis, Naperville; Richard A. Hays, Montgomery; Kenneth F. Janota, Lisle; Harold Keith Lang, Fox River Grove, all of Ill.

[73] Assignee: Molex Incorporated, Lisle, Ill.

[21] Appl. No.: 731,231

[22] Filed: Oct. 11, 1996

[51] Int. Cl.⁶ .................................... H01R 13/648
[52] U.S. Cl. ............................ 439/607; 439/108
[58] Field of Search ........................ 439/607–610, 439/98, 99, 101, 108

[56] References Cited

U.S. PATENT DOCUMENTS

| | | | |
|---|---|---|---|
| 5,195,911 | 3/1993 | Murphy | 439/607 |
| 5,277,624 | 1/1994 | Champion et al. | 439/607 |
| 5,288,247 | 2/1994 | Kaufman | 439/607 |
| 5,399,105 | 3/1995 | Kaufman et al. | 439/609 |
| 5,470,238 | 11/1995 | Walden | 439/98 |
| 5,470,259 | 11/1995 | Kaufman et al. | 439/607 |
| 5,478,260 | 12/1995 | Kaufman et al. | 439/609 |
| 5,591,050 | 1/1997 | Sueoka | 439/607 |

OTHER PUBLICATIONS

PC Card Standard, document 0295-03-1500 (FIGS. 35 & 36).

*Primary Examiner*—Hien Vu
*Attorney, Agent, or Firm*—Stacey E. Caldwell

[57] ABSTRACT

A grounding system is provided for a card-receiving header connector assembly. The header connector assembly includes a header connector mounted on a printed circuit board for receiving an IC card. The IC card includes a receptacle connector and a receptacle shield. A plurality of terminals are mounted within the header connector and are adapted for mating to terminals of the receptacle connector of the IC card. A grounding shroud is mounted on the header connector and includes a main body plate and a plurality of ground contact portions formed therein for engaging corresponding contacts on the receptacle shield of the IC card. The ground contact portions each are formed by a generally C-shaped spring arm having opposite ends joined to the main body plate of the shroud, with a portion of the spring arm between the ends being formed downwardly for asymmetrically engaging the contacts on the receptacle shield of the IC card.

10 Claims, 3 Drawing Sheets

5,725,394

GROUNDING SYSTEM FOR IC CARDS

FIELD OF THE INVENTION

This invention generally relates to the art of IC cards and, particularly, to a grounding system in a header connector assembly which receives an IC card.

BACKGROUND OF THE INVENTION

Generally, IC cards or PC cards, such as memory cards, are data input or storage devices which are electrically connected to an electronic apparatus such as a word processor, personal computer or other electronic apparatus. A memory card is a portable memory device in the shape of a rigid card which is inserted into and extracted from a connector apparatus mounted on a printed circuit board of the electronic apparatus, and provides additional storage or memory for a personal computer, for instance. The data or memory stored in the card is transferred to the electronic apparatus upon complete insertion of the card into the connector apparatus.

A typical IC or PC card is shielded and substantially surrounded by a conductive cover to protect the electrical circuitry, and in particular, the electromagnetic signals, from externally generated radiated emissions. The card is also provided with EMI or grounding contacts along outside edges thereof to provide early discharge of internally generated static electricity in order to minimize the effects of electromagnetic pulses created during the dissipation of static charges through the signal contacts. Typically (according to such standards as PCMCIA), two grounding locations are established on the outside edges of the PC card with corresponding grounding contacts inside the guide arms of a card-receiving header connector. However, this standard grounding configuration is only intended for reduction of ESD and EMI/RFI effects, and does not address the effects of signal distortion. That is to say, in a given electrical circuit with given inductance and resistance values, the current flowing through the signal terminals must be balanced with the current flowing through the ground returns. If this balance is not achieved, voltage build-up can occur and a ground current can form, thus distorting the electrical signals and creating "ground bounce". Furthermore, at high switching speeds, the existing grounding pins in the header connector are often insufficient to balance the signal terminals, and, if the grounding locations are connected to the ground pins, current can flow from the ground pins through the conductive cover and to the guide grounds creating a "ground loop". Such a "ground loop" flowing through the cover may create radiation and result in an antenna-like effect with the cover and the internal circuit board ground being at different electrical potentials.

In order to prevent such phenomena as ground bounce and ground loops in high speed connectors, particularly in the use of PC cards in computer applications, grounding shrouds have been used with card-receiving header connectors to electrically connect the ground of the PC card to the ground of the equipment or apparatus in which the card is being used. A known grounding shroud includes a plurality of cantilevered ground contacts which engage a conductive portion of the PC card cover to balance the ground returns with the current flow to decrease voltage build-up and minimize the occurrence of ground bounce and ground loops. An example of this "CardBus" configuration is shown in U.S. Pat. No. 5,288,247 assigned to The Whitaker Corporation and has become the basis of an industry standard ("CardBus PC Card Standard") which specifies the physical and electrical characteristics of PC card connector configurations.

Another method of adding ground paths in series to decrease voltage build-up and minimize the occurrence of ground bounce and group loops in PC cards is disclosed in U.S. Pat. No. 5,478,260. In that design, a grounding shroud is placed around a card-receiving header connector. The shroud includes a plurality of cantilevered contacts which engage a receptacle grounding shield on the PC card to balance the ground returns with the current flow of the system. The receptacle grounding shield is electrically isolated from the conductive cover and is fixed to the card receptacle for direct grounding between the header shroud and the internal circuit board of the PC card.

The known header grounding shrouds, such as in the '247 and '260 patents, have cantilevered grounding contacts extending forwardly toward a front or receiving end of the header connectors, and which are formed back under a top surface of the shield and wrap around a portion of the header housing to engage the grounding shield of the mating PC card. This shroud design, with its forwardly-extending cantilevered grounding contacts, defines the electrical path of the grounding circuit between the ground of the equipment or electronic apparatus and the PC card. Furthermore, the length of the forwardly-extending grounding contacts defines the overall strip width or dimension of the grounding shroud prior to forming and assembling the shroud onto the connector, thereby dictating the costs of material. In addition, the design of the beam and its deflection and force requirements dictate the stock or thickness of the material required to fabricate the shroud. Since the cantilever beam of the prior art is supported on one side (of the beam), typically the shroud must be fabricated of a relatively thick material to provide a sufficient contact normal forces between the beams and the PC card. The present invention is directed to providing a grounding system with improved grounding contacts to address the above design issues and optimize the current known grounding systems.

SUMMARY OF THE INVENTION

An object, therefore, of the invention is to provide a new and improved grounding system in a card-receiving header connector assembly.

An IC card typically includes a receptacle connector assembly mounted to an internal circuit substrate at a front insertion end of the card. A conductive cover surrounds substantially the entire substrate to provide electromagnetic shielding for the card. A receptacle grounding shield, electrically isolated from the conductive cover, extends along a top surface of the receptacle connector assembly and provides a direct ground connection to the ground circuit of the internal circuit substrate of the card.

As disclosed herein, a header connector assembly is adapted for mounting on a main printed circuit board of an underlying electronic apparatus and is adapted to receive the front insertion end of the IC card. The header connector assembly includes a dielectric connector housing and a plurality of terminals mounted therewithin. The terminals include pin portions adapted to mate with corresponding terminals in the IC card, and, through circuit traces on the main printed circuit board, connect the IC card to the underlying electronic apparatus.

The invention contemplates that a header grounding shroud is located on the header housing generally over the pin portions of the terminals and includes a generally planar main body plate and a plurality of ground contact portions formed in the main body plate for engaging corresponding ground contacts on the top surface of the receptacle grounding shield of the IC card. Each ground contact portion of the shroud is provided by a spring arm stamped out of an opening in the main body plate having opposite ends integrally joined to the main body plate at opposite edges of the opening, with a portion of the spring arm between the ends being formed downwardly for engaging a grounding contact on the receptacle grounding shield. The construction of the spring arm, being supported or joined to the shroud at both ends, allows similar contact normal forces to be achieved with less beam deflection and/or a thinner material thickness than with a spring arm construction supported only at one end.

The disclosed embodiment of the grounding shroud includes a pair of right-angled mounting flanges extending from opposite ends of the main body plate for insertion into corresponding mounting recesses in the header connector housing. The grounding shroud further includes a plurality of ground terminal portions adapted for interconnection to corresponding ground traces on the main printed circuit board. The grounding shroud also includes an elongated reinforcing rib in the main body plate extending generally perpendicular to the insertion direction of the IC card. Correspondingly, the header connector housing includes an elongated recess which receives the elongated reinforcing rib and locates it relative to the housing. The grounding shroud also includes a stiffening flange along a forward edge thereof to strengthen the shroud and provide a lead-in for the card.

The grounding shroud is stamped and formed of a conductive metal alloy sheet. Since the spring arm is stamped out of an opening in the top surface of the shroud, the material required to form the shroud does not include the additional length required to form the cantilevered contacts of the prior art. Accordingly, the structure of the shroud reduces the material costs and overall assembly costs of the connector compared to the prior art. Furthermore, since the electrical path of the grounding circuit is shortened between the spring arm and the receptacle shield as compared to the prior art, the occurrences of adverse electrical effects such as ground bounce and ground loops are minimized. Similarly, a spring arm connected on both ends to the main body plate of the shroud is electrically more effective than a spring arm connected at only one end, since the electrical path of the grounding circuit can flow through either end of the spring arm to provide redundant electrical paths or alternative electrical paths in the case of damage to one of the connections.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
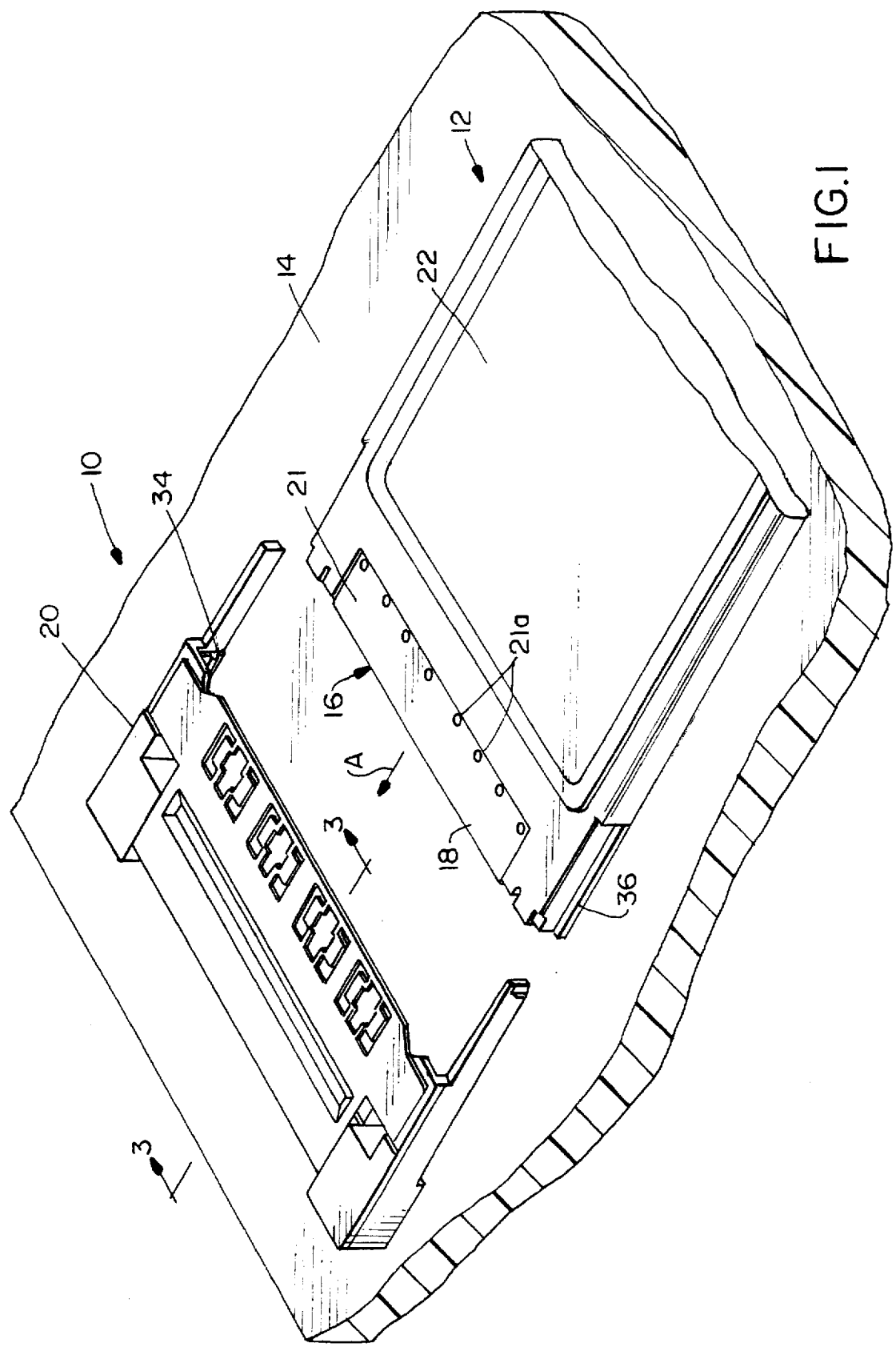
FIG. 1 is a perspective view of a header connector assembly incorporating the grounding shroud of the invention, the header connector assembly being mounted on a printed circuit board, and in conjunction with an IC card insertable into the header connector assembly.

Referring to the drawings in greater detail, and first to FIG. 1, the grounding system of the invention is embodied in a header connector assembly, generally designated 10, which provides an interconnection between an IC card, generally designated 12, and a main printed circuit board 14 of an electronic apparatus (not shown), such as a computer. Header connector assembly 10 includes a header connector, generally designated 20, adapted for mounting on main printed circuit board 14. The header connector receives the front insertion end 18 of IC card 12 as the card is inserted into the header connector in the direction of arrow "A".

IC card 12 includes an internal circuit substrate (not shown) to which is mounted a receptacle connector assembly 16 at a front or mating face 18 of the card. A receptacle grounding shield 21 extends generally along a top surface of the receptacle connector assembly and is adapted to be electrically connected to the ground circuit of the internal circuit substrate. IC card 12 further includes conductive cover panels 22 which substantially enclose the IC card and provide electromagnetic shielding for the internal circuit substrate and the electrical components mounted thereon. In the drawings, top conductive cover panel 22 of IC card 12 is shown, and is both a separate component and electrically isolated from receptacle grounding shield 21.

Figure 2:
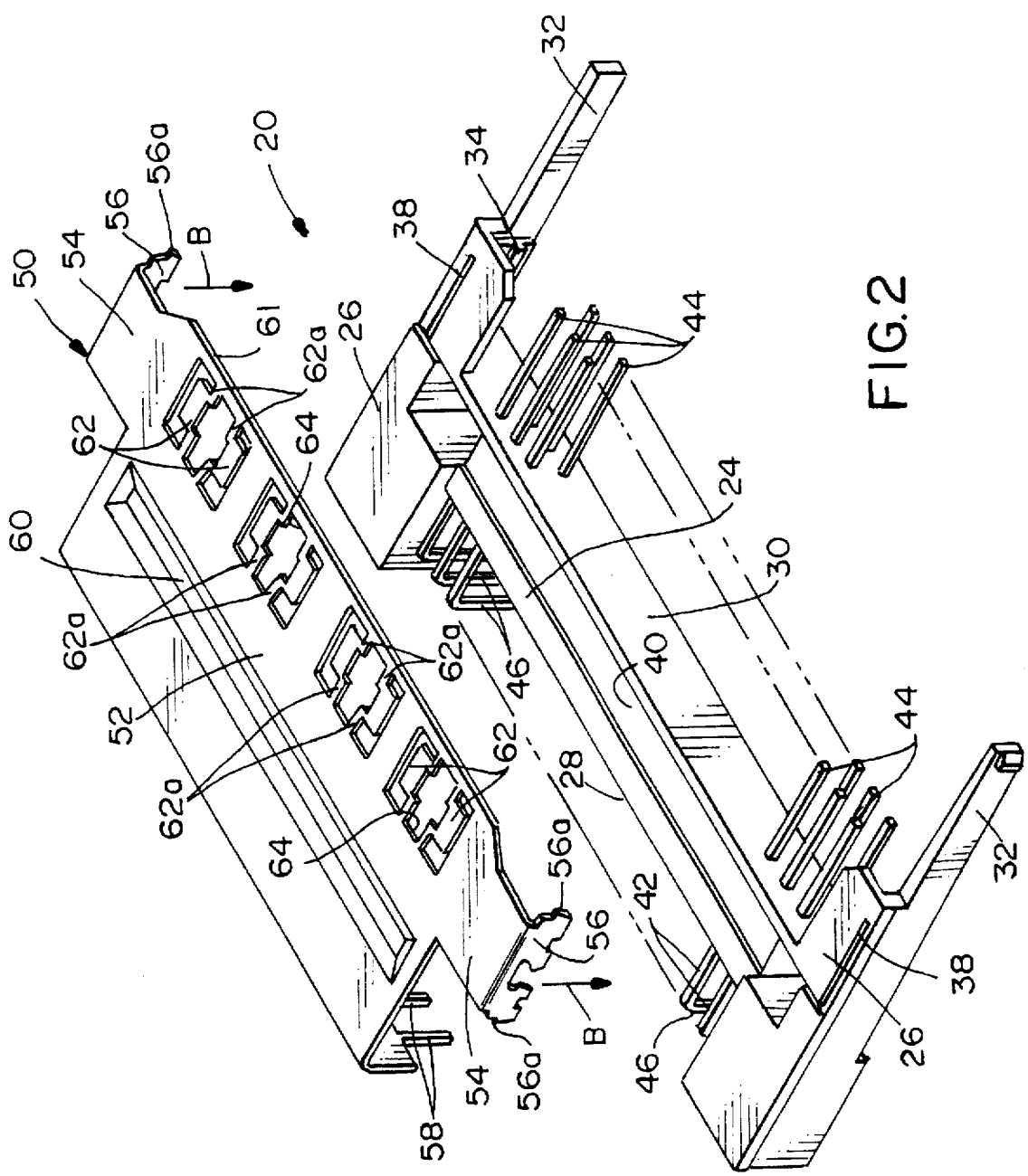
FIG. 2 is a perspective exploded view of the header connector assembly, with the grounding shroud shown prior to assembly onto the header.

Referring to FIG. 2 in conjunction with FIG. 1, header connector 20 includes an elongated dielectric housing 24 having opposite ends 26. The housing is defined by a terminating face 28 and a mating face 30 extending between opposite ends 26. A pair of guide arms 32 project from opposite ends 26 of housing 24. Guiding members 34 (FIG. 2) cooperate with projections 36 (FIG. 1) at opposite edges of the IC card to facilitate insertion and orientation of the card. A mounting slot 38 is formed in the top surface of each opposite end 26 of the housing, and a transverse recess 40 is formed in the top surface of the housing, all for purposes described hereinafter.

A plurality of terminals or pins 42 are mounted in housing 24 of header connector 20. Specifically, the terminals include mating pin portions 44 which are adapted to mate with corresponding female terminals (not shown) in receptacle connector assembly 18 of the IC card. Terminals 42 have rearwardly extending tail portions 46 for solder connection to corresponding circuit traces on circuit board 14.

Figure 3:
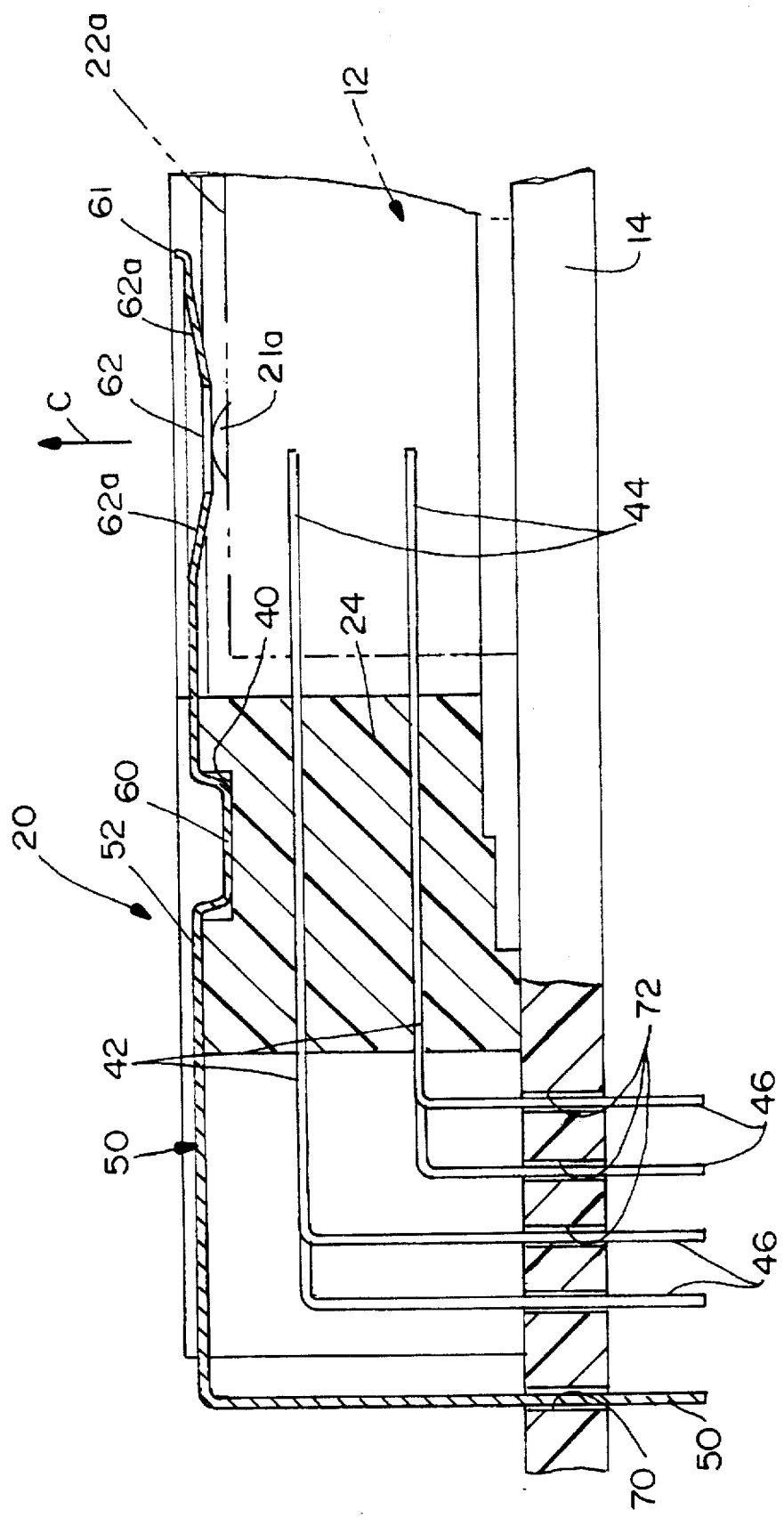
FIG. 3 is an enlarged vertical section taken generally along line 3—3 of FIG. 1.

Referring to FIGS. 2 and 3, header connector assembly 10 includes a grounding shroud, generally designated 50, which is generally positioned over portions of terminals 42, in particular, over pin portions 44. The grounding shroud is stamped and formed of a conductive metal alloy sheet and includes a generally planar main body plate 52 which is mounted on the header housing over pin portions 44 of terminals 42, as seen in FIG. 1. A pair of wing portions 54 project laterally outwardly from each opposite side of body plate 52 and terminate in downwardly projecting mounting flanges 56. The mounting flanges are insertable vertically in the direction of arrows "B" into mounting slots 38 in the top surface of opposite ends 26 of housing 24 of the header connector. Teeth 56a are formed at the edges of mounting flanges 56 for digging into the housing material at the opposite ends of mounting slots 38 for securing the shield to the housing.

Grounding shroud 50 of header connector 20 further includes a plurality of downwardly projecting ground terminal portions or tails 58 adapted for soldering to corresponding ground traces on circuit board 14.

An elongated reinforcing rib 60 is formed in body plate 52 of shroud 50 extending generally perpendicular to the insertion direction of the IC card to stiffen and strengthen the body plate. The elongated recess 40 formed in housing 24 of the header connector receives the inwardly formed reinforcing rib 20 and locates the shield relative to the housing. Grounding shroud 50 further includes a stiffening flange 61 formed along the forward edge of the shroud, as seen most clearly in FIG. 3. This flange, formed up and away from the mating pins of the header connector, further strengthens the shroud and prevents stubbing of the IC card during insertion into the header.

The invention contemplates that grounding shroud 50 be provided with a plurality of ground contact portions or spring arms 62 for engaging corresponding contacts 21a of receptacle grounding shield 21 of IC card 12. As seen in FIGS. 1 and 2, eight ground contact portions or spring arms 62 are formed out of four openings 64 stamped out of body plate 52 of the grounding shroud. Each spring arm 62 is generally C-shaped and has opposite ends 62a of the C-shape integrally joined to the shroud at opposite edges of a respective one of the stamped openings 64.

FIG. 3 shows how each spring arm 62 is formed downwardly relative to the plane of body plate 52 of grounding shroud 50. The downwardly formed spring arms are adapted to engage contacts 21a of receptacle shield 21 of IC card 12, as shown in phantom in FIG. 3. With opposite ends 62a of the contact portions of spring arms 62 being integrally joined in an asymmetric configuration to the main body plate of the shroud (FIGS. 1 and 2), upon contacting contacts 21a of the receptacle shield, the contact portions actually deflect about two separate axes. That is to say, upon insertion of an IC card into the header connector assembly, contact portions 62 deflect upwardly, generally in the direction of arrow C (FIG. 3). In addition, due to the asymmetric connection of the spring arms 62 to the main body plate of the shroud at 62a, the contact portions also deflect rotationally along the axis defined by opposite ends 62a, each toward its adjacent opening 64. This asymmetric deflection along different axes achieves an acceptable insertion force and an adequate contact normal force between the header shroud contacts and the receptacle shield contacts and prevents the spring arms 62 from taking a permanent set after repeated insertions of the IC card into the header connector. The contact arm configuration thus ensures an adequate electrical and mechanical connection between the header connector assembly and the IC card receptacle shield. Accordingly, contact portions or spring arms 62 maintain positive contact and sufficient force against the contacts of receptacle grounding shield 21 of IC card notwithstanding repeated insertions and removal of the card.

FIG. 3 also shows how terminal tails 58 of the grounding shroud extend into holes 70 in printed circuit board 14 for interconnection thereto, and how tails 46 of terminals 42 extend into holes 72 in the printed circuit board for interconnection thereto, with pin portions 44 of terminals 42 mounted in housing 24 of the header connector. Lastly, FIG. 3 shows how reinforcing rib 60 of grounding shroud 50 protrudes inwardly into recess 40 of housing 24, and how stiffening flange 61 is formed upwardly along a forward edge of the shroud.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A grounding system for an electrical connector assembly which receives an IC card, the IC card including a receptacle connector at a front insertion end of the card and a receptacle grounding shield on a top surface of the receptacle connector, the grounding system comprising:

a header connector including a dielectric connector housing into which at least the front insertion end of the IC card is inserted, and a plurality of terminals mounted in the connector housing having pin portions for mating to corresponding terminals in the IC card, and a grounding shroud generally extending over the pin portions of said terminals and including a main body plate having a plurality of ground contact portions formed therein for engaging corresponding contacts on the receptacle grounding shield of the IC card, each ground contact portion comprising a generally C-shaped spring arm having opposite ends of the C integrally joined to the shroud and the portion of the spring arm between the ends being formed downwardly for engaging a contact of the receptacle grounding shield, wherein each of said C-shaped spring arms is stamped out of an opening in the main body plate and said ends of each spring arm are integrally joined at opposite edges of the opening and wherein adjacent spring arms are mirror-image C-shapes such that the opening of the C-shape of one spring arm faces the opening of the C-shape of an adjacent spring arm, whereby, upon engaging the contact of the receptacle grounding shield, the C shape of the spring arms causes the ground contact portions to deflect about two separate axes.

2. The grounding system of claim 1 wherein said grounding shroud further includes a pair of right-angled mounting flanges projecting outwardly from the main body plate and into corresponding mounting recesses in the connector housing.

3. The grounding system of claim 1 wherein said grounding shroud includes an elongated reinforcing rib extending generally perpendicular to the insertion direction of the IC card.

4. The grounding system of claim 3 wherein the connector housing includes an elongated recess for receiving and locating said elongated reinforcing rib relative to the connector housing.

5. An electrical connector assembly adapted to receive a shielded IC card, comprising:

a header connector adapted for mounting on a printed circuit board and including a dielectric housing into which the IC card is inserted, a plurality of terminals mounted in the header connector having pin portions adapted for interconnection to mating terminals of the IC card, and a grounding shroud extending over the pin portions of said terminals and including a main body having at least one ground contact portion for engaging the shield of the IC card, the ground contact portion comprising a generally C-shaped spring arm stamped out of an opening in the main body plate having opposite ends of the C integrally joined to the main body plate and the portion of the spring arm between the ends being formed downwardly for engaging the IC card shield, wherein the C-shaped spring arm is stamped out of an opening in the main body plate and said ends of the spring arm are integrally joined at opposite edges of the opening and wherein a second ground contact portion is positioned adjacent the at least one ground contact portion such that adjacent ground contact portions have mirror-image C-shaped spring arms such that the opening of the C-shape of one spring arm faces the opening of the C-shape of the adjacent spring arm, whereby, upon contacting the shield of the IC card, the ground contact portions deflect about two separate axes.

6. The electrical connector assembly of claim 5 wherein said grounding shroud includes ground terminal portions adapted for interconnection to corresponding ground traces on the printed circuit board.

7. The electrical connector assembly of claim 5 wherein said grounding shroud includes a pair of mounting flanges insertable vertically into corresponding mounting recesses in the header connector housing.

8. The electrical connector assembly of claim 7 wherein said grounding shroud includes an elongated reinforcing rib extending generally perpendicular to the insertion direction of the IC card.

9. The electrical connector assembly of claim 8 wherein the connector housing includes an elongated recess for receiving and locating said elongated reinforcing rib.

10. The electrical connector assembly of claim 7 wherein said grounding shroud includes a stiffening flange at a forward end thereof for strengthening the shroud and preventing stubbing of the IC card during insertion of the card into the connector assembly.

* * * * *